US011221879B2

(12) United States Patent
Xu et al.

(10) Patent No.: US 11,221,879 B2
(45) Date of Patent: *Jan. 11, 2022

(54) OPTIMIZING HARDWARE FIFO INSTRUCTIONS

(71) Applicant: Google LLC, Mountain View, CA (US)

(72) Inventors: Yuanzhong Xu, Mountain View, CA (US); James M. Stichnoth, San Jose, CA (US); David Alexander Majnemer, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/919,968

(22) Filed: Jul. 2, 2020

(65) Prior Publication Data

US 2020/0341807 A1    Oct. 29, 2020

Related U.S. Application Data

(63) Continuation of application No. 16/395,697, filed on Apr. 26, 2019, now Pat. No. 10,733,016.

(51) Int. Cl.
*G06F 9/38*    (2018.01)
*G06F 9/30*    (2018.01)
(Continued)

(52) U.S. Cl.
CPC .......... *G06F 9/4881* (2013.01); *G06F 9/3814* (2013.01); *G06F 9/3855* (2013.01); *G06F 9/3877* (2013.01)

(58) Field of Classification Search
CPC ...... G06F 9/3855; G06F 9/3857; G06F 9/384; G06F 9/3836; G06F 9/3838;
(Continued)

(56) References Cited

U.S. PATENT DOCUMENTS 6,549,930 B1    4/2003    Chrysos et al.
7,328,332 B2    2/2008    Tran
(Continued)

OTHER PUBLICATIONS

Sleiman et al., Efficiently Scaling Out-of-Order Cores for Simultaneous Multithreading, 13 pages (Year: 2016).*
(Continued)

*Primary Examiner* — Thuy Dao
(74) *Attorney, Agent, or Firm* — Fish & Richardson P.C.

(57) ABSTRACT

Methods, systems, and apparatus for scheduling first-in-first-out instructions are described. In one aspect, a method includes receiving data representing code of a program to be executed by a processing unit comprising hardware processors. For each of one or more of the hardware processors, an order of independent groups of first-in-first-out (FIFO) instructions for execution by the hardware processor is identified in the data representing the code of the program. For each independent group of FIFO instructions for execution by the hardware processor, a path length metric that represents how long it will take to reach an end of the program from the independent group of FIFO instructions is determined. A new order of the independent groups of FIFO instructions for execution by the hardware processor is generated based at least on the path length metric for each independent group of FIFO instructions for execution by the hardware processor.

20 Claims, 3 Drawing Sheets

(51) Int. Cl.
    *G06F 9/46*     (2006.01)
    *G06F 9/44*     (2018.01)
    *G06F 9/00*     (2006.01)
    *G06F 9/302*     (2018.01)
    *G06F 9/48*     (2006.01)

(58) Field of Classification Search
    CPC .............. G06F 9/45554; G06F 9/4558; G06F 11/3636; G06F 8/456; G06F 8/45; G06F 8/314; G06F 8/443; G06F 8/452; G06F 9/45558; G06F 9/4881; G06F 9/3814; G06F 9/3877; G06F 9/3851; G06F 9/3802; G06F 9/30145; G06F 9/3005; G06F 9/3826
    See application file for complete search history.

(56) References Cited

U.S. PATENT DOCUMENTS

| | | | |
|---|---|---|---|
| 7,900,022 | B2 | 3/2011 | Feghali et al. |
| 8,823,823 | B2 | 9/2014 | Silverbrook |
| 9,645,802 | B2 | 5/2017 | Mehara et al. |
| 9,753,708 | B2 * | 9/2017 | Fink .................. G06F 8/456 |
| 10,078,620 | B2 | 9/2018 | Farabet |
| 10,114,558 | B2 * | 10/2018 | Miller ................ G06F 3/0659 |
| 10,241,796 | B2 | 3/2019 | Jung |
| 10,372,668 | B2 | 8/2019 | Kang |
| 10,445,094 | B2 | 10/2019 | Beard |
| 2010/0275208 | A1 | 10/2010 | Carrie |
| 2013/0086360 | A1 | 4/2013 | Zeng et al. |
| 2013/0212365 | A1 | 8/2013 | Chen et al. |
| 2014/0201506 | A1 | 7/2014 | Parashar et al. |
| 2016/0342889 | A1 | 9/2016 | Thorson et al. |
| 2017/0060579 | A1 | 3/2017 | Vincent |
| 2018/0181503 | A1 | 6/2018 | Nicol |
| 2019/0130291 | A1 | 5/2019 | Nicol |

OTHER PUBLICATIONS

PCT International Search Report and Written Opinion in International Application No. PCT/US2019/063228, dated Mar. 9, 2020, 20 pages.
Xilinx Inc., AXI4-Stream FIFO v4.1, 54 pages (Year: 2016).
Yu-Hsin et al., "Eyeriss" ACM Sigarch Computer Architecture News, Jun. 2016, 13 pages.

* cited by examiner

OPTIMIZING HARDWARE FIFO INSTRUCTIONS

CROSS-REFERENCE TO RELATED APPLICATIONS

This application is a continuation application of, and claims priority to, U.S. patent application Ser. No. 16/395,697, titled "OPTIMIZING HARDWARE FIFO INSTRUCTIONS," filed on Apr. 26, 2019. The disclosure of the foregoing application is incorporated herein by reference in its entirety for all purposes.

BACKGROUND

Some processors, e.g., domain-specific processors, can include long latency, high throughput hardware units. For example, some processors can include systolic arrays to compute complex numerical workloads efficiently. A natural programming interface for such hardware units is first-in-first-out (FIFO) queues defined in the instruction set architecture (ISA) of the processor as there are instructions responsible for pushing data to these units and popping data out of the units. However, hardware FIFOs impose ordering constraints on instructions, and may keep extra state as configurations, making it difficult for compilers to optimize and schedule instructions efficiently.

SUMMARY

This specification describes technologies relating to improving an order of FIFO instructions, e.g., at compile time, to reduce latency in performing machine learning and other computations.

In general, one innovative aspect of the subject matter described in this specification can be embodied in a method that includes receiving data representing code of a program to be executed by a processing unit comprising hardware processors. The method includes, for each of one or more of the hardware processors: identifying, in the data representing the code of the program, an order of independent groups of first-in-first-out (FIFO) instructions for execution by the hardware processor; determining, for each independent group of FIFO instructions for execution by the hardware processor, a path length metric that represents how long it will take to reach an end of the program from the independent group of FIFO instructions; and generating, based at least on the path length metric for each independent group of FIFO instructions for execution by the hardware processor, a new order of the independent groups of FIFO instructions for execution by the hardware processor. Updated code for the program is generated based at least on each new order of independent groups of FIFO instructions for the one or more hardware processors. Output code for execution by the hardware processors is generated based on the updated code for the program. The output code is provided to the hardware processors. Other implementations of this and other aspects include corresponding systems, methods, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

These and other implementations can each optionally include one or more of the following features. In some aspects, the data representing the code of the program includes a compiler intermediate representation of source code of the program. In some aspects, the output code includes compiled machine code executable by the one or more hardware processors.

Some aspects include generating, based on the data representing the code of the program, a graph that represents a sequence of instructions for the program. Generating the new order of the independent groups of FIFO instructions for a given hardware processor can include re-ordering the independent groups of FIFO instructions in the graph to generate an updated graph. Generating updated code for the program based at least on each new order of independent group of FIFO instructions for the one or more hardware processors can include generating an updated sequence of instructions based on the updated graph.

In some aspects, generating updated code for the program based at least on each new order of independent group of FIFO instructions for the one or more hardware processors can include identifying, in the updated graph, instructions that are not identified as being FIFO instructions; for one or more of the identified instructions: selecting an independent group of FIFO instructions based at least on a path length between the independent group of FIFO instructions and the identified instruction in the update graph; and scheduling, in the updated code, the identified instruction with the selected long-latency group.

In some aspects, multiple hardware processors execute independent groups of FIFO instructions. Some aspects can include determining, for at least one of the multiple hardware processors, an order of a set of independent FIFO instructions executed by the at least one hardware processor based on whether the independent groups of FIFO instructions are on a critical path of the program. Some aspects can include determining that a first hardware processor includes multiple independent groups of FIFO instructions and determining that an independent group of FIFO instructions of a second hardware processor is an instruction to receive data output by one of the multiple independent groups of FIFO instructions of the first hardware processor. In some aspects, generating a new order of the independent groups of FIFO instructions for execution by the first hardware processor can include moving the one independent group of FIFO instructions of the first hardware processor to execute before one or more other independent groups of FIFO instructions of the first hardware processor in response to determining that the independent group of FIFO instructions of the second hardware processor of the multiple hardware processors is an instruction to receive data output by one of the multiple independent groups of FIFO instructions of the first hardware processor.

In some aspects, each independent group of FIFO instructions includes one or more input instructions for providing input data to the hardware processor and one or more output instructions for outputting data from the hardware processor based on input data. In some aspects, a particular hardware processor of the processing unit is a configurable hardware processor that executes instructions using multiple different configurations. Some aspects can include identifying, in the data representing the code of the program, a set of FIFO instructions that will be executed by the particular hardware processor using a same configuration for the particular hardware processor and determining a new order, in the updated code for the application, for the set of FIFO instructions such the set of FIFO instructions are executed in a sequence without any intervening FIFO instructions that require a different configuration of the particular hardware processor.

In some aspects, the one or more hardware processors include multiple processors. Some aspects can include determining, for each of the multiple hardware processors, a performance metric that represents how long it will take the hardware processor to complete all FIFO instructions for the hardware processor, determining an order of evaluation of the multiple hardware processors based on the performance metric for each of the multiple hardware processors, and determining a new order of the independent groups of FIFO instructions for each of the multiple hardware processors one at a time in the determined order of evaluation.

The subject matter described in this specification can be implemented in particular embodiments so as to realize one or more of the following advantages. The latency in executing a program can be reduced by generating an improved order of FIFO instructions that are used by hardware processors to input and output data. Non-FIFO instructions can be grouped with FIFO instructions, e.g., with the closest FIFO instructions, to further improve the reduction in latency in executing the program. For example, by grouping, with a FIFO instruction, another instruction that provides data for the FIFO instruction to load into a hardware processor, the instructions can be scheduled together such that the amount of time the FIFO instruction has to wait for such data is reduced. By reducing the latency in executing the program, complex workloads, e.g., deep neural network workloads, can be completed quicker and more efficiently. Thus, by making use of the described techniques at compile time, a given program can be executed at run time with reduced latency relative to conventionally compiled programs executed on the same hardware processors.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
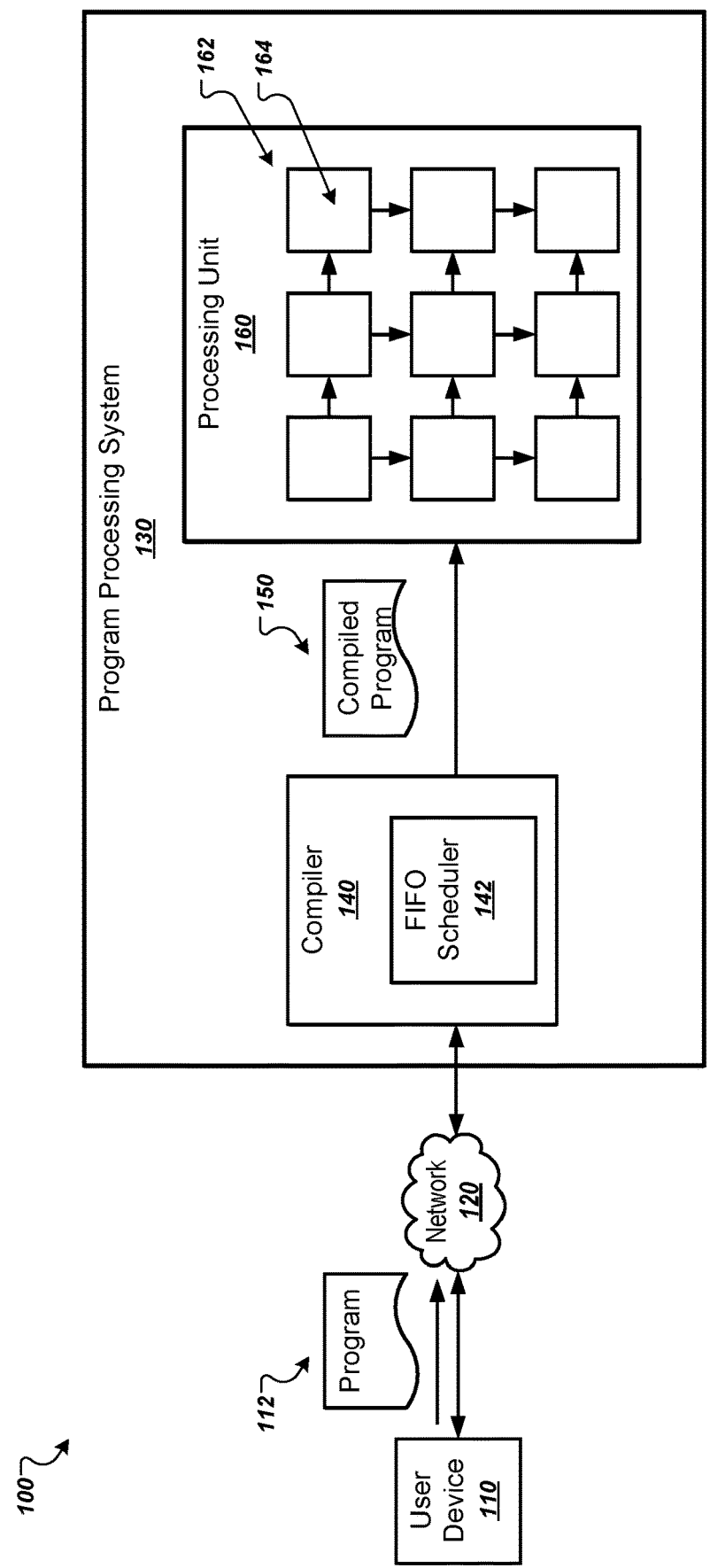
FIG. 1 is a block diagram of an example environment in which a program processing system modifies programs and performs computations using the modified programs.

In general, the subject matter described in this specification relates to scheduling hardware FIFO instructions for hardware processors to reduce the overall latency of a program being executed by the processors. A processing unit can include multiple hardware processors, including long-latency, high-throughput hardware processors that perform complex computations efficiently. For example, a long-latency hardware processor can be configured to perform matrix multiplication computations for a machine learning model or other complex computations (e.g., digital signal processing, video encoding, decoding, etc.) using dedicated hardware and such computations may take multiple processor cycles to compute the output.

These long-latency hardware processors can be programmed via push instructions to send input data to the hardware processor and pop instructions to fetch result data from the hardware processor to provide to another hardware processor or to another FIFO of the hardware processor. The pushes and pops typically happen in a FIFO order so that the hardware processor can be modeled as a FIFO queue. In some cases, the hardware processor can also maintain extra state to represent configurations, which can be mutated via additional instructions. For example, a hardware processor can have multiple configurations and the hardware processor can maintain stats information that specifies the current configuration.

Some hardware processors produce a result based on a single input. In this example, a pop (e.g., output) from the FIFO corresponds to a push (e.g., input) to the FIFO. Other hardware processors require multiple inputs to generate one or more results. In this example, a group of one or more pops from the FIFO corresponds to a group of pushes to the FIFO. For example, a hardware processor that performs matrix multiplication operation can include multiple pushes to provide the values of the matrices to the hardware processor and one or more pops to output the computed value(s) to another hardware processor or FIFO. Such a group of related push(es) and the corresponding pop(s) that are based on the push(es) represent an indivisible unit of computation performed by the hardware processor. Each group of one or more pops from a FIFO that correspond to, e.g., that output one or more results that are based on, one or more pushes to the same FIFO is an independent group of FIFO instructions. Different independent groups of FIFO instructions can be reordered to reduce latency. In some implementations, FIFO instructions within an independent group are not reordered.

Dependencies between instructions can be modeled in a directed graph. Instructions are the vertices or nodes in the graph and the dependences are edges between the vertices or nodes. If a later instruction must wait for an earlier instruction to finish before the later instruction begins, the graph can include a directed edge from the earlier instructions to the later instruction. The length of the edge can represent the wait time between the instructions. The graph can encode all types of dependencies among instructions, including producer to consumer, memory read after write, and FIFO ordering constraints.

There are multiple types of FIFO ordering dependencies, including control dependencies and data dependencies. Control dependencies are imposed by the hardware processor's FIFO processing order. A control dependency edge from a first instruction to a second instruction represents that the second instruction is executed after the first instruction and must wait for the first instruction to finish before the second instruction begins. A data dependency from a first instruction to a second instruction represents that the second instruction uses data resulting from the first instruction. For example, a data dependency can represent that a pop of the result of an operation must wait for another instruction, e.g., a push of the input to the operation.

An example of a control dependency is a later push (or pop) of a FIFO queue that must wait on an earlier push or pop of the same FIFO queue. The wait time between instructions in this example is based on the throughput of the hardware processor. Another example of a control dependency is when a FIFO queue does not have enough room for a new push. The new push must wait for a pop that would make enough room in the FIFO queue for the new push. An example of a data dependency is, in an independent group of FIFO instructions, the result pops must wait on the input pushes. In this example, the hardware processor performs a computation using the data received by the input pushes to determine the data output by the output pops. The wait time in this example is determined by the latency of the hardware processor. Each of these dependencies restrict how the order of FIFO instructions can be determined or modified.

If the original order of FIFO instructions is less than optimal, the FIFO control dependencies can prevent an optimal instruction schedule for the hardware processors. For example, consider two hardware FIFOs (e.g., hardware processors that are modeled as a FIFO queue), FIFO1 and FIFO2. Also consider that there are 10 independent pushes to FIFO1 and the last result from FIFO1 is used as an input to the first push to FIFO2. The FIFO control dependencies require that all 10 FIFO1 operations finish before scheduling the first FIFO1 push. To address this problem, a new order of the FIFO instructions can be determined, e.g., before the final control dependencies are determined. In this example, the new order of FIFO instructions can put the previous last result of FIFO1 as the first result of FIFO1 so that the latency of FIFO2 waiting for this result is reduced. The techniques described herein use performance metrics, critical path heuristics, and other considerations to schedule independent groups of FIFO instructions and other related instructions such that the latency of execution of the program is reduced.

FIG. 1 is a block diagram of an example environment 100 in which a program processing system 130 modifies programs and performs computations using the modified programs. The machine learning processing system 130 can receive programs 112 from user devices 110 over a data communication network 120, e.g., a local area network (LAN), a wide area network (WAN), the Internet, a mobile network, or a combination thereof.

The programs 112 can include workloads, such as machine learning workloads, digital signal processing workloads, video encoding/decoding workloads, or other appropriate workloads. For example, each program 112 can define, or be in the form of, a directed computation graph that specifies operators for a workload. Each operator represents an operation, e.g., a numerical operation, to be performed by a processing unit 160 of the machine learning processing system 130. For example, the operators can represent mathematical operations (e.g., addition, multiplication, maximum, minimum, etc.), tensor operations (e.g., reshaping, transpose, etc.), data replication operations, and/or other appropriate operations.

The program processing system 130 includes a compiler 140 that compiles the programs 112 into machine instructions for the processing unit 160. The processing unit 160 can include one or more hardware processors that execute the machine instructions to perform the computations defined by the programs 112 and/or modified versions of the programs as described below. In this example, the processing unit 160 includes a systolic array 162 of hardware processors 164. Other appropriate arrangements of processors can also be used. For example, the processing unit 160 can be a graphics processing unit (GPU) or an application-specific integrated circuit, e.g., a machine learning accelerator application-specific integrated circuit such as a tensor processing unit (TPU).

The compiler 140 can also modify the programs 112 to improve the performance of the processing unit 160 in executing the machine instructions. For example, the compiler 140 can modify the program 112 based on the characteristics of the processing unit 160 that will perform the computations of the program 112. The compiler 140 can also adjust or determine a schedule of instructions to improve the performance of the processing unit 160 in executing the program, e.g., to reduce the latency in executing the program at run time.

In particular, the compiler 140 includes a FIFO scheduler 142 that can determine whether one or more FIFO instructions can be moved in a schedule of instructions for the processors 164. If so, the FIFO scheduler 142 can determine a new order of the FIFO instructions. The FIFO scheduler 142 can also determine a new order of other non-FIFO instructions, e.g., based on the new order of the FIFO instructions.

In some implementations, the compiler 140 generates, or receives, data defining a directed graph of instructions for the program 112. For example, the compiler 140 can receive the program 112 and convert the program 112 into a compiler intermediate representation. The compiler intermediate representation can be in static single assignment form, e.g., before register allocation. The compiler 140 can generate the graph based on a set of instructions for the program in the compiler intermediate representation. As described above, instructions are the vertices or nodes in the graph and the dependences are edges between the vertices or nodes. The graph can include nodes for FIFO instructions and non-FIFO instructions, such as operations, transferring data for hardware processors that are not modeled as FIFO queues, storing data, etc.

The FIFO scheduler 142 can analyze the graph and determine an order of independent groups of FIFO instructions. As described above, an independent group of FIFO instructions is a group of one or more pops from a FIFO that correspond to one or more pushes to the same FIFO. As the processing unit 160 can include multiple hardware FIFOs, the FIFO scheduler 142 can determine the order of FIFO instructions for each hardware FIFO, e.g., one at a time.

The FIFO scheduler 142 can remove control dependencies between independent groups of FIFO instructions in the graph. The FIFO scheduler 142 can leave the control dependencies within an independent group of FIFO instructions intact as these instructions may not be reordered by the FIFO scheduler 142. The FIFO scheduler 142 can then determine the order of the independent groups of FIFO instructions for each hardware FIFO.

In some implementations, the FIFO scheduler 142 evaluates the instructions and determines the order of the independent groups of FIFO instructions for each hardware FIFO one at a time, e.g., in a particular order. For example, the FIFO scheduler 142 can determine the order of the independent groups of FIFO instructions for each hardware FIFO in order based on how performance-dominant the hardware FIFOs are in the program 112.

To determine the order in which the hardware FIFOs are evaluated, the FIFO scheduler 142 can determine a performance metric for each hardware FIFO in the program 112. The performance metric for a hardware FIFO can represent how performance-dominant the operations performed by the hardware FIFO are in the program 112. In some implementations, the performance metric for a hardware FIFO is based on, e.g., proportional to, how long it takes to execute all pushes and pops for the hardware FIFO. For example, the performance metric for a FIFO can be based on, e.g., proportional to, an estimated or actual duration of time to execute all of the pushes and pops, which may be based on the throughput of the hardware FIFO, the computations performed on the data by the hardware FIFO, and/or the amount of data on which the hardware FIFO performs the computations. As the pops are used to output data of computations performed by the hardware FIFO using data input by the corresponding pushes, the pops must wait until the computations are complete. Thus, the performance metric for a hardware FIFO can be based on how long it takes to perform the computations, e.g., based on the throughput and computations of the hardware FIFO.

The FIFO scheduler 142 can evaluate each hardware FIFO in order from the most performance-dominant hardware FIFO (e.g., longest to complete the pushes and pops), to the least performance-dominant FIFO (e.g., shortest to complete the pushes and pops), based on the performance metrics. The order of independent groups of FIFO instructions of a hardware FIFO become constraints on other hardware FIFOs. As the more performance-dominant hardware FIFOs can have the greatest impact on the overall performance of the program 112, fewer constraints should be placed on the performance-dominant hardware FIFOs than placed on the least performance-dominant hardware FIFOs. Determining the order of independent groups of FIFO instructions for each hardware FIFO in this order based on the performance metrics can result in a better schedule of instructions with reduced latency for the program 112 relative to other orders of evaluation.

To determine the order of the independent groups of FIFO instructions for a given hardware FIFO, the FIFO scheduler 142 can determine a path length metric for each independent group of FIFO instructions of the hardware FIFO. The path length metric for an independent group of FIFO instructions can represent how long it will take to reach an end of the program 112 from the independent group of FIFO instructions. For example, the path length metric can be based on the length of the longest path from the independent group of FIFO instructions to the end of the program 112, e.g., to the end of the graph representing the instructions of the program 112. The length of each path can be based on the length of the edges along the path as the edges represent the wait time between instructions. The length of each path can also be based on the instructions along each path, the latency of the hardware processor(s) that will execute the instructions, and/or the throughput of the hardware processor(s) as these parameters affect how long it takes to traverse the path to the end of the program 112. For example, the length of each path can be based on, e.g., proportional to, an aggregate length of the edges along the path and how long it will take, e.g., an estimated duration of time, to execute each instruction on the path based on the parameters.

The FIFO scheduler 142 can sort the independent groups of FIFO instructions for the hardware FIFO based on the path length determined for each independent group of FIFO instructions. The FIFO scheduler 142 can determine an order of the independent groups of FIFO instructions for the hardware FIFO based on the determined path lengths. For example, the FIFO scheduler 142 can order the independent groups of FIFO instructions for the hardware FIFO from longest path length to the shortest path length. That is, the FIFO scheduler 142 can determine an order such that the independent group of FIFO instructions with the longest determined path length (e.g., the independent group whose shortest path length is the longest of the independent groups) is first for the hardware FIFO, the independent groups with the second longest path length is second, and so on.

However, this ordering must respect the control dependencies of the hardware FIFO and any data dependencies between the independent groups of FIFO instructions of the hardware FIFO. For example, if the independent group of FIFO instructions having the longest path length pushes data output by a different independent group of FIFO instructions into the hardware FIFO, the different independent group of FIFO instructions can be scheduled before the independent group of FIFO instructions having the longest path length.

After determining the order of independent groups of FIFO instructions for a hardware FIFO, the FIFO scheduler 142 can add control dependencies to the graph based on the determined order. The FIFO scheduler 142 can then move to the next most performance-dominant hardware FIFO and determine an order of hardware FIFO instructions for this hardware FIFO. The FIFO scheduler 142 can continue this process until all hardware FIFOs have been evaluated and, if appropriate, a new order of independent groups of FIFO instructions has been determined for the hardware FIFO.

In some implementations, the FIFO scheduler 142 can also use scheduling heuristics, such as critical paths on the graph, and interdependencies between hardware FIFOs in determining the order of the independent groups of FIFO instructions. For example, the FIFO scheduler 142 can order independent groups of FIFO instructions in a way that shortens the critical path of the graph, which reduces the overall latency of the program 112.

In some implementations, the FIFO scheduler 142 evaluates the graph to identify independent groups of FIFO instructions that are on the critical path of the graph. The critical path of the graph may be the longest path from the beginning of the graph to the end of the graph. The lengths of the paths used to determine the critical path can be based on how long it will take to traverse the paths, e.g., using the lengths of the edges, the latency of the hardware FIFOs on the paths, the throughput of the hardware FIFOs on the paths, and/or other appropriate data, as described above.

The FIFO scheduler 142 can evaluate each independent group of FIFO instructions on the critical path to determine whether reordering other independent groups of FIFO instructions will shorten the critical path. If so, the order of the FIFO instructions that are not on the critical path can be reordered to shorten the critical path.

For example, a first hardware FIFO, FIFO1, can have multiple independent groups of FIFO instructions that each include one or more pushes and one or more pops. A second hardware FIFO, FIFO2, can have an independent group of FIFO instructions that is on the critical path of the program 112 and that has a push of the result output by one of the pops of FIFO1. If this pop of FIFO1 is not first in the order of FIFO instructions for FIFO1, then the FIFO scheduler 142 can determine a new order of the FIFO instructions for FIFO1 such that this pop of data required by FIFO2 is first in the new order. This reduces the amount of time that FIFO2 on the critical path has to wait for the required data to make its computations, which reduces the overall latency of the program 112.

If other independent groups of FIFO instructions of FIFO1 output data that is input to other FIFOs on the critical path of the program, the FIFO scheduler 142 can determine the order of these instructions based on when the data will be needed by the other FIFOs and/or how performance-dominant the other FIFOs are in the program 112. For example, if another FIFO is more performance-dominant than FIFO2 and requires output from a different independent group of FIFO instructions of FIFO1, this different independent group may be first in the order for FIFO1.

In some implementations, the FIFO scheduler 142 can omit or combine some FIFO operations on a hardware processor 164 to improve efficiency. For example, when a hardware processor 164 is configurable, changing the configuration of the hardware processor 164 requires additional instructions. Execution of these additional instructions can be expensive in terms of processing requirements and/or latency. In some cases, the configuration of a hardware processor 164 may be switched between configurations periodically based on the operations that will be performed by the hardware processor 164 and/or the data being input to the hardware processor 164 using push instructions.

If multiple FIFO operations that share the same configuration can be co-located in the graph or in the schedule generated from the graph, the frequency of switching configurations of the hardware processor 164 can be reduced, resulting in faster and more efficient computations. The FIFO scheduler 142 can identify FIFO instructions for a hardware processor 164 for which the configuration will be changed during execution of the program.

For each such hardware processor 164, the FIFO scheduler 142 can identify candidate FIFO instructions that can be grouped together. For example, the FFIO scheduler 142 can identify, for each configuration, each FIFO instruction for the hardware processor 164 that requires the hardware processor 164 to have that configuration. The FIFO scheduler 142 can then determine whether grouping the candidate FIFO instructions that have the same configuration (or at least a portion of the FIFO instructions that have the same configuration) into a group will result in reduced latency for the program 112. For example, the FIFO scheduler 142 can determine whether adjusting the location of one or more of the FIFO instructions in the graph to group the FIFO instructions that have the same configuration would negatively affect the critical path of the graph, e.g., whether the grouping would extend the length of the critical path. If so, the FIFO scheduler 142 may determine to not group the FIFO instructions. If not, the FIFO scheduler 142 can group the FIFO instructions together in the graph so that all of the FIFO instructions in the group are executed without having to switch the configuration of the hardware processor 164.

Another example of co-locating FIFO instructions is for hardware processors that process data having a data size that is greater than the data size of its input. For example, a hardware processor 164 may be configured to process 32-bit data but the input data is only 16-bit data. Two inputs of 16-bit data may be combined and the hardware processor 164 can process the combined data. However, it is also possible in this example that combining the data can negatively affect the critical path of the graph.

The FIFO scheduler 142 can identify FIFO instructions for a hardware processor 164 for which the hardware processor 164 processes data having a larger data size than the data being input to the hardware processor 164 by the FIFO instructions. The FIFO scheduler 142 can then determine, for each such hardware processor 164, whether adding instructions to combine data and/or whether causing FIFO instructions to wait for some of the data to be combined will negatively affect the critical path of the graph, e.g., by extending the length of the critical path. If so, the FIFO scheduler 142 can determine to not combine the data for the hardware processor 164. If not, the FIFO scheduler 142 can adjust the graph to combine the inputs to the hardware processor 164, e.g., by adding instructions to combine the data of the inputs and edges from the source of the inputs to the instructions for combining the data.

When determining whether an independent group of FIFO instructions should be co-located or grouped with other independent groups of FIFO instructions, the FIFO scheduler 142 can search the potential candidates (e.g., candidate FIFO instructions that have the same configuration or a smaller data size than what the hardware processor processes). The FIFO scheduler 142 can then determine to co-locate or combine in places where the independent group of FIFO instructions' critical path to the end of the graph would still include the control dependency edges surrounding the independent group of FIFO instructions. That is, such improvements are done where the program 112 is bound by the control dependencies of the FIFO hardware processor.

After determining the order of the FIFO instructions, the FIFO scheduler 142 can generate a schedule, e.g., a linear schedule, of instructions that will be compiled by the compiler 140 and executed by the hardware processors 164. As described above, the graph can include non-FIFO instructions in addition to the FIFO instructions. Non-FIFO instructions typically have shorter latencies than the FIFO instructions and typically do not have similar ordering constraints. Thus, critical path heuristics are not as useful for scheduling the non-FIFO instructions.

The FIFO scheduler 142 can cluster non-FIFO instructions with the FIFO instructions. In some implementations, the FIFO scheduler 142 clusters each non-FIFO instruction with the FIFO instructions that are closest to the non-FIFO instruction in the graph. As described above, the length of an edge in the graph can represent the wait time between the instructions. The FIFO scheduler 142 can evaluate the lengths of the edges between a non-FIFO instruction and one or more FIFO instructions, e.g., one or more FIFO instructions that are connected to the non-FIFO instruction, to determine the closest FIFO instructions to the non-FIFO instruction. The graph can include multiple edges between a non-FIFO instruction and a FIFO instruction, e.g., if there are intervening instructions between the non-FIFO instruction and the FIFO instruction. In such a case, the FIFO scheduler 142 can aggregate the lengths of the edges (or the wait times represented by the edges) to determine the total length between the non-FIFO instruction. The FIFO scheduler 142 can then cluster the non-FIFO instruction with the independent group of FIFO instructions that include the FIFO instruction that has the shortest length from the non-FIFO instruction. The FIFO scheduler 142 can do this for each non-FIFO instruction until all non-FIFO instructions are in a cluster with a FIFO instruction.

The FIFO scheduler 142 can sort the groups of instructions using critical path heuristics. For example, the FIFO schedule can determine, for each cluster of instructions, the length of the critical path of the FIFO instructions of the cluster to the end of the program. This critical path can represent the longest path from the FIFO instructions of the cluster to the end of the program. The FIFO scheduler 142 can then schedule the clusters of instructions based on the lengths of the critical paths. For example, the FIFO scheduler 142 can schedule the clusters of instructions in order from longest length to shortest length.

When the program involves multiple hardware FIFOs and there are data dependencies between them, this approach can cause large live ranges of registers if the utilization rates of different FIFOs are different. For example, if one in every three results popped from FIFO1 is pushed into FIFO2, the critical path of the push to FIFO2 is much shorter than the pop from FIFO1. Thus, the live range of the pop may be very long after sorting based on the lengths of the critical paths. In such cases, the FIFO scheduler 142 can move the data-consuming FIFO instructions closer to the corresponding data-producing FIFO instructions, when that does not increase the critical path of the graph. For example, the FIFO scheduler 142 can move the data-producing push to the earliest place in the graph that the data-producing push can be moved without increasing the critical path length of the graph.

The FIFO scheduler 142 can also schedule the instructions within each cluster using one or more scheduling techniques. For example, the FIFO scheduler 142 can use a list scheduling technique with priorities that are determined based on the graph topology and characteristics of the hardware architecture of the hardware processors 164.

The compiler 140 can finish compiling the program based on the schedule of instructions and provide the compiled program 150 to the processing unit 160. The hardware processors 164 of the processing unit 160 can execute the compiled program 150. For example, the hardware processors 164 can each execute the FIFO instructions and non-FIFO instructions according to the order of the determined schedule, as defined by the compiled program 150.

Figure 2:
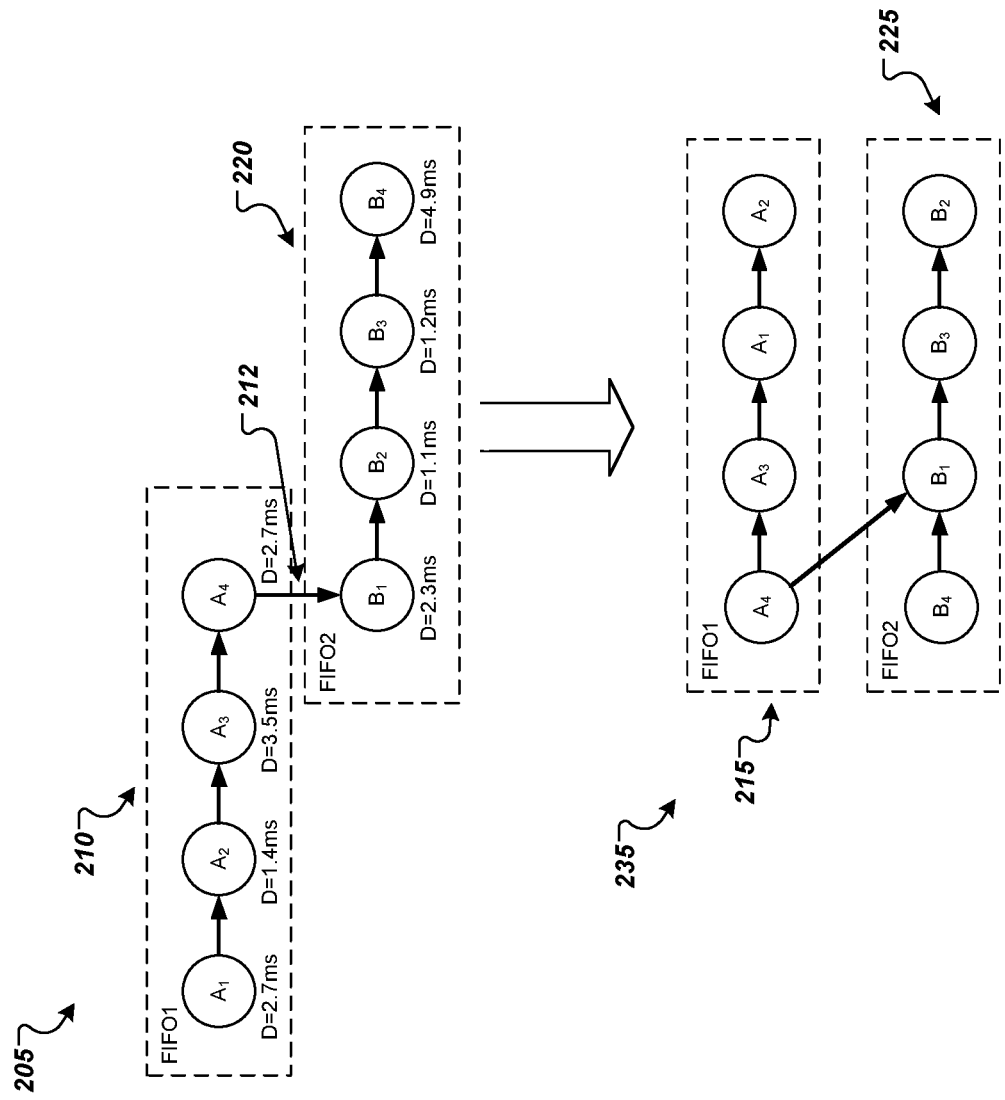
FIG. 2 depicts a directed graph of instructions of a program and an updated graph of instructions of the program.

FIG. 2 depicts a directed graph 205 of instructions of a program and an updated graph 235 of instructions of the program. The directed graph 205 can be a portion of a graph that represents dependencies between instructions of a program. In this example, the graph 205 includes independent groups of FIFO instructions $A_1$-$A_4$ of a first hardware FIFO, FIFO1. The independent groups of FIFO instructions $A_1$-$A_4$ are in a first order 210 based on a first version of the program, e.g., a version of the program received from a user device. The graph 205 also includes independent groups of FIFO instructions $B_1$-$B_4$ of a first hardware FIFO, FIFO1. The independent groups of FIFO instructions $B_1$-$B_4$ are also in a first order 220 based on a first version of the program, e.g., a version of the program received from a user device.

The FIFO scheduler 142 can determine a new order of the FIFO instructions for each FIFO, e.g., one at a time based on how performance-dominant FIFO1 and FIFO2 are in the program. In this example, assume that FIFO2 is more performance-dominant than FIFO1.

The independent groups of FIFO instructions for each FIFO can be ordered based on a length of the longest path for each independent group of FIFO instructions to the end of the program. In this example, each independent groups of FIFO instructions has an associated estimated duration of time that is based on the longest path for the independent groups of FIFO instructions. For example, the independent group of FIFO instructions $A_1$ has an estimated duration of time of 2.1 milliseconds (ms). The duration of time can be an estimated duration of time to traverse the path, as described above.

The FIFO scheduler 142 can determine a new order 225 of the independent groups of FIFO instructions $B_1$-$B_4$ based on the path lengths or the estimated durations of time. In this example, the new order 225 the independent groups of FIFO instructions $B_1B_4$ is from longest duration to shortest duration. As the independent group of FIFO instructions $B_4$ has the longest duration (4.9 ms), this independent group of FIFO instructions $B_4$ is first in the new order 215 of the updated graph 235.

The FIFO scheduler 142 can also determine a new order 215 of the independent groups of FIFO instructions $A_1$-$A_4$ based on the path lengths or the estimated durations of time. For example, the FIFO scheduler 142 can determine the new order 215 based on the estimated durations, similar to the new order 225 of the independent groups of instructions $B_1$-$B_4$. The FIFO scheduler 142 can also consider critical path heuristics and interdependencies between the FIFOs. In this example, the graph 205 includes a data dependency between the independent groups of FIFO instructions $A_4$ and $B_1$ as shown by the edge 212. Thus, $B_1$ must wait for output data to pop from $A_4$ in order to push the data into its hardware processor. To reduce this wait time, the FIFO scheduler 142 can put $A_4$ first in the new order and order the other independent groups of FIFO instructions $A_1$-$A_3$ based on their estimated durations. In this example, the new order 215 has $A_4$ first, then $A_3$, $A_1$, and $A_2$.

Figure 3:
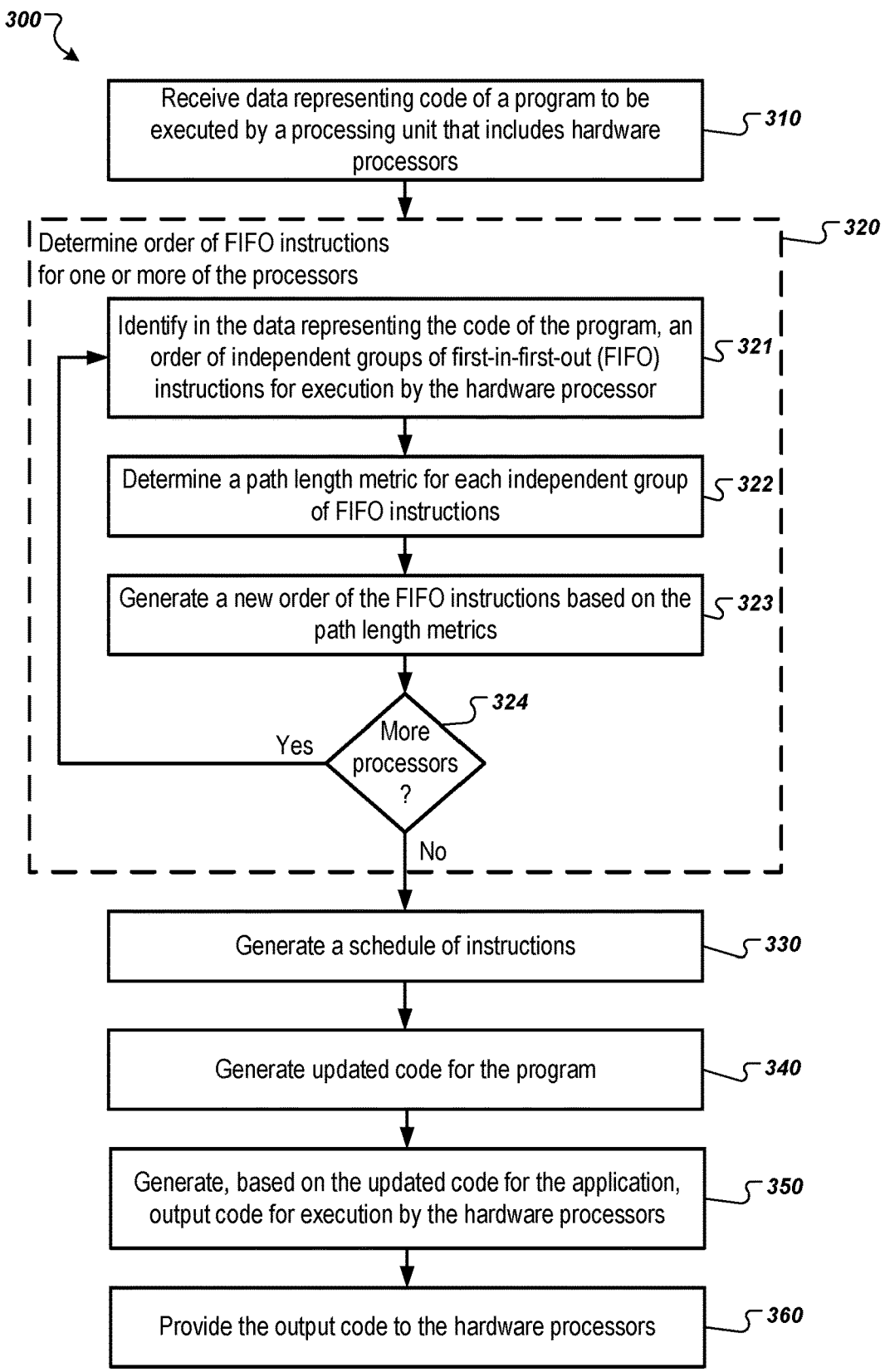
FIG. 3 is a flow diagram that illustrates an example process for modifying a program.

FIG. 3 is a flow diagram that illustrates an example process 300 for modifying a program. Operations of the process 300 can be performed by a system that includes one or more data processing apparatus. For example, operations of the process 300 can be performed by the program processing system 130 of FIG. 1.

The system receives a program to be executed by a processing unit that includes hardware processors (310). The program can include one or more workloads, such as machine learning workloads, digital signal processing workloads, video encoding/decoding workloads, or other appropriate workloads. For example, the program can define, or be in the form of, a directed computation graph that specifies operators for a workload.

The processing unit can include one or more long-latency, high-throughput hardware processors that can be modeled as FIFO queues. The processing unit can also include other types of lower latency hardware processors that are not modeled as FIFO queues.

The system determines, for each of one or more hardware processors, a new order of independent groups of FIFO instructions that will be executed by the hardware processor (320). For example, the system can receive, or determine, a compiler intermediate representation of source code of the program based on the hardware processors of the processing unit. This compiler intermediate representation of the program can include a directed graph of instructions that will be executed by the hardware processors. The graph can also indicate, for each instruction, the hardware processor that will execute the instruction.

The system can identify, as the one or more hardware processors, each hardware processor modeled as a FIFO queue in the graph. These processors are also referred to as hardware FIFOs in this document. The graph can include, for each hardware FIFO, one or more independent groups of FIFO instructions. For hardware FIFOs that include multiple independent groups, the system can evaluate the independent groups of instructions for each hardware FIFO to determine whether it would shorten the latency of the program using a new order for the independent groups of FIFO instructions for the hardware FIFO. If so, the system can determine the new order for the hardware FIFO. The system can determine the new order of FIFO instructions for each of the one or more hardware FIFOs using constituent operations 321-324. If the one or more hardware processors includes multiple hardware processors, the system can evaluate each hardware processor in order based on how performance-dominant the hardware processor is in the program as described above.

The system identifies, in the data representing the code of the program, an order of independent groups of FIFO instructions for execution by the hardware processor (321). The system can then determine a path length metric for each identified independent group of FIFO instructions (322).

The path length metric for an independent group of FIFO instructions can represent how long it will take to reach an end of the program from the independent group of FIFO instructions. For example, the path length metric can be based on the length of the longest path from the independent group of FIFO instructions to the end of the program. As described above, the length of each path can be based on the length of the edges along the path, the instructions along each path, the latency of the hardware processor(s) that will execute the instructions, and/or the throughput of the hardware processor(s). For example, the length of each path can be based on, e.g., proportional to, an aggregate length of the edges along the path and how long it will take, e.g., an estimated duration of time, to execute each instruction on the path based on the parameters.

The system generates a new order of the independent groups of FIFO instructions based on the path length metrics (324). For example, the system can generate the new order such that the independents groups of FIFO instructions are ordered from the independent group having a path length metric that represents the longest path length to the independent group having a path length metric that represents the longest path length. As described above, the system can also consider other critical path heuristics and interdependencies between hardware FIFOs when determining the order of independent groups of FIFO instructions for a hardware FIFO. The system can update the graph based on the determined order and add control dependencies between the FIFO instructions based on the new order.

The system determines whether there are additional hardware processors for which to evaluate the order of independent groups of FIFO instructions (324). If so, the system returns to operation 321 to evaluate another hardware processor. If not, the system generates a schedule of instructions. The schedule of instructions can include a linear schedule of instructions that includes FIFO instructions and non-FIFO instructions.

The system can order the independent groups of FIFO instructions in the schedule based on the length of the critical path from each independent group of FIFO instructions to the end of the updated graph. For example, the order of the independent groups of FIFO instructions in the schedule can be from the independent group having the longest critical path to the independent group having the shortest critical path. For the non-FIFO instructions, the system can group the non-FIFO instructions with the closest independent group of FIFO instructions in the graph, as described above.

The system generates updated code for the program (340). The system can generate the updated code based on the schedule of instructions. The system can then generate, based on the updated code, output code for execution by the hardware processors (350). For example, the system can finish compiling the code into machine instructions for each hardware processor.

The system can then provide the output code to each hardware processor (360). The hardware processors can execute the instructions when the processing unit is executing the program.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more data processing apparatus, the method comprising:
    receiving data representing code of a program to be executed by a processing unit comprising hardware processors;
    for each of a plurality of the hardware processors:
        identifying, in the data representing the code of the program, one or more independent groups of first-in-first-out (FIFO) instructions for execution by the hardware processor; and
        determining a performance metric that represents how performance-dominant operations performed by the hardware processor are in the program;
    determining an order of evaluation of the plurality of hardware processors based on the performance metric for each hardware processor of the plurality of hardware processors; and
    evaluating each of the plurality of hardware processors in the determined order of evaluation to determine whether to reorder the FIFO instructions of each hardware processor of the plurality of hardware processors;
    for at least one of the plurality of hardware processors, determining a new order of the FIFO instructions for the hardware processor;
    generating updated code for the program based at least on each new order of FIFO instructions for the plurality of hardware processors;
    generating, based on the updated code for the program, output code for execution by the hardware processors; and
    providing the output code to the hardware processors.

2. The method of claim 1, wherein determining a new order of the FIFO instructions for the hardware processor comprises:
    determining, for each independent group of FIFO instructions for execution by the hardware processor, a path length metric that represents how long it will take to reach an end of the program from the independent group of FIFO instructions; and
    generating, based at least on the path length metric for each independent group of FIFO instructions for execution by the hardware processor, a new order of the independent groups of FIFO instructions for execution by the hardware processor.

3. The method of claim 1, further comprising identifying, as the plurality of hardware processors, one or more hardware FIFO units each comprising a hardware processor modeled using a FIFO queue.

4. The method of claim 1, wherein the performance metric for each hardware processor is based at least in part on how long it will take the hardware processor to complete the FIFO instructions of the one or more independent groups of FIFO instructions for the hardware processor.

5. The method of claim 1, wherein the performance metric for each hardware processor is based at least in part on how long it takes to execute all pushes and pops for the FIFO instructions of the hardware processor.

6. The method of claim 1, wherein the performance metric for each hardware processor is based at least in part on (i) a throughput of the hardware processor, (ii) computations performed on data by the hardware processor, (iii) an amount of data on which the hardware processor performs the computations, or (iv) any combination of (i), (ii), and (iii).

7. The method of claim 1, wherein the data representing the code of the program comprises a compiler intermediate representation of source code of the program.

8. The method of claim 1, wherein the output code comprises compiled machine code executable by the hardware processors.

9. The method of claim 1, wherein, for at least one of the plurality of hardware processors, determining a new order of the FIFO instructions for the hardware processor comprises:
    determining a new order of FIFO instructions for a first hardware processor; and
    determining, for each one or more subsequent hardware processors in the determined order of evaluation and subject to one or more constraints placed on an order of FIFO instructions of the subsequent hardware processor based on the new order of FIFO instructions for the first hardware processor, a new of order of FIFO instructions for the second subsequent hardware processor.

10. The method of claim 9, wherein evaluating each of the plurality of hardware processors in the determined order of evaluation reduces a number of constraints placed on the new order of FIFO instructions for hardware processors having higher performance metrics that would otherwise be placed on the new order of FIFO instructions for the hardware processors having the higher performance metrics by the new order of FIFO instructions for hardware processors having lower performance metrics.

11. A system comprising:
    a data processing apparatus; and
    a memory storage apparatus in data communication with the data processing apparatus, the memory storage apparatus storing instructions executable by the data processing apparatus and that upon such execution cause the data processing apparatus to perform operations comprising:
        receiving data representing code of a program to be executed by a processing unit comprising hardware processors;
        for each of a plurality of the hardware processors:
            identifying, in the data representing the code of the program, one or more independent groups of first-in-first-out (FIFO) instructions for execution by the hardware processor; and
            determining a performance metric that represents how performance-dominant operations performed by the hardware processor are in the program;
        determining an order of evaluation of the plurality of hardware processors based on the performance metric for each hardware processor of the multiple plurality of hardware processors; and
        evaluating each of the plurality of hardware processors in the determined order of evaluation to determine whether to reorder the FIFO instructions of each hardware processor of the plurality of hardware processors;

for at least one of the plurality of hardware processors, determining a new order of the FIFO instructions for the hardware processor;

generating updated code for the program based at least on each new order of FIFO instructions for the plurality of hardware processors;

generating, based on the updated code for the program, output code for execution by the hardware processors; and providing the output code to the hardware processors.

12. The system of claim 11, wherein determining a new order of the FIFO instructions for the hardware processor comprises:

determining, for each independent group of FIFO instructions for execution by the hardware processor, a path length metric that represents how long it will take to reach an end of the program from the independent group of FIFO instructions; and generating, based at least on the path length metric for each independent group of FIFO instructions for execution by the hardware processor, a new order of the independent groups of FIFO instructions for execution by the hardware processor.

13. The system of claim 11, wherein the operations comprise identifying, as the plurality of hardware processors, one or more hardware FIFO units each comprising a hardware processor modeled using a FIFO queue.

14. The system of claim 11, wherein the performance metric for each hardware processor is based at least in part on how long it will take the hardware processor to complete the FIFO instructions of the one or more independent groups of FIFO instructions for the hardware processor.

15. The system of claim 11, wherein the performance metric for each hardware processor is based at least in part on how long it takes to execute all pushes and pops for the FIFO instructions of the hardware processor.

16. The system of claim 11, wherein the performance metric for each hardware processor is based at least in part on (i) a throughput of the hardware processor, (ii) computations performed on data by the hardware processor, (iii) an amount of data on which the hardware processor performs the computations, or (iv) any combination of (i), (ii), and (iii).

17. The system of claim 11, wherein the data representing the code of the program comprises a compiler intermediate representation of source code of the program.

18. The system of claim 11, wherein the output code comprises compiled machine code executable by the hardware processors.

19. The system of claim 11, wherein, for at least one of the plurality of hardware processors, determining a new order of the FIFO instructions for the hardware processor comprises:

determining a new order of FIFO instructions for a first hardware processor; and determining, for each one or more subsequent hardware processors in the determined order of evaluation and subject to one or more constraints placed on an order of FIFO instructions of the subsequent hardware processor based on the new order of FIFO instructions for the first hardware processor, a new of order of FIFO instructions for the subsequent hardware processor.

20. A non-transitory computer storage medium encoded with a computer program, the program comprising instructions that when executed by one or more data processing apparatus cause the one or more data processing apparatus to perform operations comprising:

receiving data representing code of a program to be executed by a processing unit comprising hardware processors;

for each of a plurality of the hardware processors:

identifying, in the data representing the code of the program, one or more independent groups of first-in-first-out (FIFO) instructions for execution by the hardware processor; and determining a performance metric that represents how performance-dominant operations performed by the hardware processor are in the program;

determining an order of evaluation of the plurality of hardware processors based on the performance metric for each hardware processor of the plurality of hardware processors; and evaluating each of the plurality of hardware processors in the determined order of evaluation to determine whether to reorder the FIFO instructions of each hardware processor of the plurality of hardware processors;

for at least one of the plurality of hardware processors, determining a new order of the FIFO instructions for the hardware processor;

generating updated code for the program based at least on each new order of of FIFO instructions for the plurality of hardware processors;

generating, based on the updated code for the program, output code for execution by the hardware processors; and providing the output code to the hardware processors.

* * * * *